US012626556B2

(12) United States Patent
Kuenzi et al.

(10) Patent No.: US 12,626,556 B2
(45) Date of Patent: May 12, 2026

(54) ELECTRONIC LOCKING METHOD AND SYSTEM FOR PROVIDING AUTOMATICNOTIFICATION ENSURING SECURITY OF A STORAGE SPACE

(71) Applicant: HONEYWELL INTERNATIONAL INC., Charlotte, NC (US)

(72) Inventors: Adam Kuenzi, Silverton, OR (US); Douglas Despain, Salem, OR (US); Ramesh Lingala, Hyderabad (IN); Baby Shalini Bandari, Hyderabad (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 169 days.

(21) Appl. No.: 18/395,569

(22) Filed: Dec. 24, 2023

(65) Prior Publication Data

US 2024/0233467 A1 Jul. 11, 2024

Related U.S. Application Data

(60) Provisional application No. 63/478,848, filed on Jan. 6, 2023.

(51) Int. Cl.
*G07C 9/28* (2020.01)
*G07C 9/00* (2020.01)

(52) U.S. Cl.
CPC ........... *G07C 9/28* (2020.01); *G07C 9/00309* (2013.01); *G07C 2009/00317* (2013.01)

(58) Field of Classification Search
None
See application file for complete search history.

(56) References Cited

U.S. PATENT DOCUMENTS

| | | | |
|---|---|---|---|
| 7,261,606 | B2 | 8/2007 | Mickelson et al. |
| 7,653,457 | B2 | 1/2010 | Bloom |
| 8,902,040 | B2 | 12/2014 | Greisen et al. |
| 8,933,804 | B2 | 1/2015 | Causey et al. |
| 8,990,889 | B2 | 3/2015 | Van Till et al. |
| 9,124,650 | B2 | 9/2015 | Maharajh et al. |
| 9,715,780 | B2 | 7/2017 | Garrison |
| 9,935,928 | B2 | 4/2018 | Brown |
| 10,253,527 | B2 | 4/2019 | Beasley et al. |
| 10,289,806 | B2 | 5/2019 | Hyde et al. |
| 10,448,211 | B1 | 10/2019 | Shen et al. |
| 10,453,285 | B2 | 10/2019 | Steinmetz |

(Continued)

*Primary Examiner* — K. Wong
(74) *Attorney, Agent, or Firm* — Seager, Tufte & Wickhem, LLP

(57) ABSTRACT

A method of providing automatic real-time notifications to at least one user by an electronic locking system includes detecting whether the user is leaving a storage space secured by the electronic lock. The method further includes determining whether a latch of the electronic lock is open upon detecting the user is leaving the storage space. The method includes monitoring a change in location of a device of the user with respect to the electronic lock and displaying a first alert notification on the device if the location of the device is at a threshold level of a communication range and the latch status is open. Subsequently, the method includes determining whether the location of the device is outside of a geofence range in presence or absence of any user response to the first alert notification and displaying a second alert notification if the latch status is still open.

20 Claims, 4 Drawing Sheets

(56) References Cited

U.S. PATENT DOCUMENTS

| | | | | |
|---|---|---|---|---|
| 10,635,801 | B2 * | 4/2020 | Tovey | H04L 63/0853 |
| 10,748,112 | B2 * | 8/2020 | Walsh | G06Q 10/0836 |
| 10,755,508 | B2 | 8/2020 | Ghorpade et al. | |
| 10,757,371 | B2 | 8/2020 | Smith et al. | |
| 10,789,568 | B2 | 9/2020 | Greenberger et al. | |
| 10,818,119 | B2 * | 10/2020 | Robertson | H04W 4/021 |
| 10,924,461 | B2 | 2/2021 | Britt et al. | |
| 10,936,991 | B2 | 3/2021 | Zamer et al. | |
| 10,943,420 | B1 | 3/2021 | Heller et al. | |
| 11,089,165 | B2 | 8/2021 | Yssa | |
| 11,144,873 | B2 | 10/2021 | Fee et al. | |
| 11,161,245 | B2 | 11/2021 | Kushner | |
| 11,164,241 | B2 | 11/2021 | Greenberger et al. | |
| 11,231,706 | B1 | 1/2022 | Curlander et al. | |
| 11,270,251 | B2 | 3/2022 | Fee et al. | |
| 11,276,025 | B2 | 3/2022 | Perez | |
| 11,311,132 | B2 | 4/2022 | Eivaz | |
| 11,366,469 | B2 | 6/2022 | Kuo et al. | |
| 11,384,567 | B2 | 7/2022 | Derakhshan | |
| 11,468,395 | B2 | 10/2022 | Javidan et al. | |
| 11,472,552 | B2 | 10/2022 | Gil et al. | |
| 11,580,613 | B2 | 2/2023 | Wagner et al. | |
| 11,636,459 | B2 | 4/2023 | Fullman et al. | |
| 11,694,496 | B2 | 7/2023 | Kirchhausen | |
| 11,759,040 | B2 * | 9/2023 | Richardson | G06Q 10/0836 705/332 |
| 11,829,922 | B2 | 11/2023 | Waris et al. | |
| 11,829,927 | B2 | 11/2023 | Gillen et al. | |
| 11,887,163 | B2 | 1/2024 | Ta et al. | |
| 11,958,702 | B2 * | 4/2024 | Salter | G06Q 10/0832 |
| 12,045,774 | B2 | 7/2024 | Hill | |
| 12,068,874 | B2 | 8/2024 | Jorasch et al. | |
| 2002/0178016 | A1 | 11/2002 | Mclellan | |
| 2006/0237427 | A1 | 10/2006 | Logan | |
| 2007/0056339 | A1 | 3/2007 | Irgens et al. | |
| 2007/0176739 | A1 | 8/2007 | Raheman | |
| 2007/0222258 | A1 | 9/2007 | Bacco et al. | |
| 2010/0255890 | A1 | 10/2010 | Mikkelsen et al. | |
| 2015/0120601 | A1 | 4/2015 | Fee | |
| 2015/0186840 | A1 | 7/2015 | Torres et al. | |
| 2016/0300184 | A1 | 10/2016 | Zamer et al. | |
| 2018/0101833 | A1 | 4/2018 | Parekh | |
| 2018/0121872 | A1 | 5/2018 | Walsh | |
| 2018/0242768 | A1 | 8/2018 | Lewis | |
| 2018/0336612 | A1 | 11/2018 | Bullard, III et al. | |
| 2019/0056724 | A1 | 2/2019 | High et al. | |
| 2019/0111955 | A1 | 4/2019 | Canoso et al. | |
| 2019/0130349 | A1 * | 5/2019 | Ferguson | G06Q 10/08355 |
| 2019/0235494 | A1 | 8/2019 | Cantrell et al. | |
| 2019/0387910 | A1 | 12/2019 | Stoich | |
| 2020/0097925 | A1 | 3/2020 | Bierach et al. | |
| 2021/0142603 | A1 | 5/2021 | Carter | |
| 2021/0225103 | A1 * | 7/2021 | Flynn | H04L 9/16 |
| 2021/0300297 | A1 | 9/2021 | Kursar | |
| 2021/0303852 | A1 | 9/2021 | Hill et al. | |
| 2021/0366604 | A1 | 11/2021 | Templeton et al. | |
| 2022/0027848 | A1 | 1/2022 | Kashi et al. | |
| 2023/0109673 | A1 | 4/2023 | Phillips et al. | |
| 2023/0186265 | A1 | 6/2023 | Cataldo et al. | |
| 2023/0196858 | A1 | 6/2023 | Gabonay et al. | |
| 2023/0196859 | A1 | 6/2023 | Levy et al. | |
| 2023/0277009 | A1 | 9/2023 | Cothern et al. | |
| 2023/0308303 | A1 | 9/2023 | Jorasch et al. | |
| 2023/0343163 | A1 | 10/2023 | Dobbins et al. | |
| 2023/0352987 | A1 | 11/2023 | Jakubowski | |
| 2024/0046642 | A1 | 2/2024 | Jorasch et al. | |
| 2024/0073322 | A1 | 2/2024 | Jorasch et al. | |
| 2024/0089413 | A1 | 3/2024 | Maggiore et al. | |
| 2024/0092582 | A1 | 3/2024 | Kalouche | |
| 2024/0144764 | A1 | 5/2024 | Heller | |
| 2024/0161561 | A1 | 5/2024 | Molt | |
| 2024/0191448 | A1 | 6/2024 | High et al. | |
| 2024/0233471 | A1 | 7/2024 | Schmidt et al. | |
| 2024/0254807 | A1 | 8/2024 | Mantena et al. | |
| 2024/0257594 | A1 | 8/2024 | Skaaksrud et al. | |

* cited by examiner

ELECTRONIC LOCKING METHOD AND SYSTEM FOR PROVIDING AUTOMATICNOTIFICATION ENSURING SECURITY OF A STORAGE SPACE

CROSS REFERENCE TO A RELATED APPLICATION

The application claims the benefit of U.S. Provisional Application No. 63/478,848 filed Jan. 6, 2023, the contents of which are hereby incorporated in their entirety.

FIELD OF THE INVENTION

The disclosure relates to the field of electronic lock systems. In particular, the disclosure relates to an electronic locking method and system for providing an automatic real-time notification to at least one user using one or more communication mediums.

BACKGROUND

In electronic lock systems where an electronic lock is securing a storage space, once a tenant accesses the electronic lock, it is desirable to ensure that the tenant leaves the space secured with a door closed and the latch bolt of the electronic lock physically re-locked.

The electronic lock may not be physically locked unless and until the tenant moves the latch trigger from left to right to engage the latch bolt with the door frame. The challenge is sometimes when the tenant may forget to move the latch trigger from left to right. Also, the tenant may leave the storage area (for e.g., 5 miles away, etc.), and thereafter the tenant may realize that the electronic lock is not physically locked. It may cause a security risk to the storage space.

SUMMARY

This summary is provided to introduce a selection of concepts in a simplified format that are further described in the detailed description of the invention. This summary is not intended to identify key or essential inventive concepts of the invention, nor is it intended for determining the scope of the invention.

Disclosed is a method for providing an automatic real-time notification to at least one user by an electronic locking system. The method includes detecting whether the at least one user is leaving a storage space secured by an electronic lock of the electronic locking system. A sensor data of a sensing unit associated with a device of the at least one user is configured to detect the at least one user leaving the storage space. The device may be at least one of a mobile device, smart phone, laptop, smart watch, tablets etc. The device is associated with the at least one user of the electronic locking system. Upon detecting that the at least one user is leaving the storage space, the method includes determining whether a latch of the electronic lock is showing an open status. The method further includes monitoring a change in a location of the device with respect to the electronic lock upon determining the latch of the electronic lock is showing the open status. Subsequently, the method includes displaying a first alert notification on an application of the device, when the location of the device is at a threshold level of a communication range of the electronic lock. Thereafter, the method includes detecting whether any user response is received in response to the displayed first alert notification. In one or presence or an absence of any response corresponding to the first alert notification, the method includes determining whether the location of the device is outside of a geofence range around the electronic lock. Further, when it is determined that the location of the device is outside of the geofence range, the method includes displaying a second alert notification on the application of the device indicating the latch of the electronic lock in the open status.

In one or more embodiments, the storage space corresponds to one of a storehouse, a warehouse, a house, or a repository.

In one or more embodiments, the electronic lock is installed on a door frame to lock the storage space, in which the latch is configured to protrude into the door frame.

In one or more embodiments, the communication range corresponds to a Bluetooth Low Energy (BLE) range or an Ultra-Wide-band (UWB) range. Further, the geofence range corresponds to a GPS-enabled communication range.

In one or more embodiments, the monitoring of the change of location of the device with respect to the electronic lock is based on a BLE or an Ultra-wideband Received Signal Strength Indication (UWB RSSI) threshold.

In one or more embodiments, a status of the latch is periodically monitored or determined by scanning the electronic lock for the Bluetooth or UWB advertisement indicating the latch status In one or more embodiments, the method may further include storing, as a first event, the displayed first alert notification in a cloud server when the user response is received in response to the sent first alert notification.

In one or more embodiments, the method may further include storing the displayed second alert notification in the cloud server as a second event.

In one or more embodiments, the method may further include determining that the latch status is closed by a periodic scanning of the electronic lock for the Bluetooth or UWB advertisement indicating the latch status.

In one or more embodiments, the method may further include disabling the monitoring of the change of location of the device when the status of the latch is closed.

In one or more embodiments, the method may further include disabling the monitoring of the change of location of the device when a user response indicating an intention to keep the latch open is received in response to the displayed second alert notification.

In one or more embodiments, the electronic lock includes a locking status indicator having two colors. The first color of the locking status indicator indicates that the latch is open, and the second color of the locking status indicator indicates that the latch is closed.

In one or more embodiments, the method may further include periodically sending, via a gateway connection, a message from the electronic locking system to the cloud server in any one of the cases including when it is determined that the latch status is now open, the latch status is still open after a time period has passed since the last status indicating the latch was open, or the latus is now closed.

In one or more embodiments, the displayed second alert notification includes an indication that the latch is still open and a plurality of options corresponding to the selection of whether to continue monitoring the latch status, ignore and tell me again later, or intended to keep the latch open.

In one or more embodiments, the response to the plurality of options corresponding to the second alert notification is recorded in the cloud server for a reporting purpose.

In one or more embodiments, the gateway connection corresponds to a Long Range Wide Area Network (LoRaWAN).

Also disclosed herein is an electronic locking system for providing an automatic real-time notification to at least one user. The electronic locking system includes a sensing unit, an electronic lock including a latch, and at least one processor. The at least one processor is configured to detect whether the at least one user is leaving a storage space secured by an electronic lock of the electronic locking system based on a sensor data of the sensing unit associated with a device of the at least one user. The device may be at least one of a mobile device, smart phone, laptop, smart watch, tablets, etc. Upon detecting that the at least one user is leaving the storage space, the at least one processor if further configured to determine whether the latch of the electronic lock is showing an open status. Further, the at least one processor is configured to monitor a change in a location of the device with respect to the electronic lock upon determining the latch of the electronic lock is showing the open status. Subsequently, when the location of the device is at a threshold level of a communication range of the electronic lock, the at least one processor is configured to display a first alert notification on an application of the device indicating a last known status of the latch. Further, the at least one processor is configured to detect whether any user response is received in response to the displayed first alert notification. In one of presence or an absence of any user response corresponding to the first alert notification, the at least one processor is configured to determine whether the location of the device is outside of a geofence range around the latch. Furthermore, when it is determined that the location of the device is outside of the geofence range, a second alert notification on the application of the device indicating the latch of the electronic lock in the open status.

In one or more embodiments, the electronic lock is installed on a door frame to lock the storage space, in which the latch is configured to protrude into the door frame.

In one or more embodiments, the communication range corresponds to a Bluetooth Low Energy (BLE) range or an Ultra-Wide-band (UWB) range. Further, the geofence range corresponds to a GPS-enabled communication range.

In one or more embodiments, the monitoring of the change of location of the device with respect to the electronic lock is based on a BLE or an Ultra-wideband Received Signal Strength Indication (UWB RSSI) threshold.

To further clarify the advantages and features of the method and system, a more particular description of the method and system will be rendered by reference to specific embodiments thereof, which are illustrated in the appended drawing. It is appreciated that these drawings depict only typical embodiments of the invention and are therefore not to be considered limiting its scope. The invention will be described and explained with additional specificity and detail with the accompanying drawings.

BRIEF DESCRIPTION OF THE DRAWINGS

These and other features, aspects, and advantages will become better understood when the following detailed description is read with reference to the accompanying drawings in which like characters represent like parts throughout the drawings, wherein.

Figure 1:
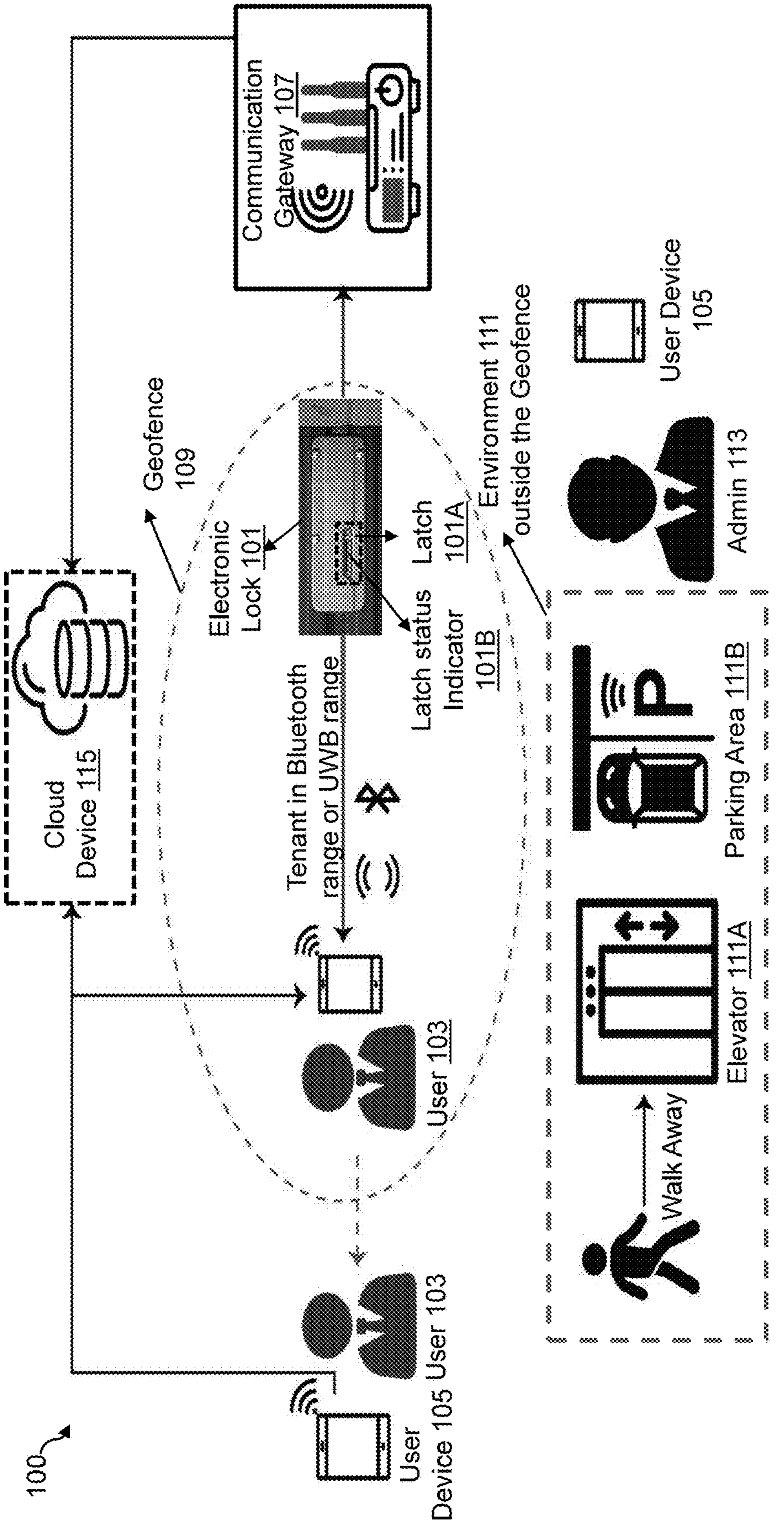
FIG. 1 illustrates an example block diagram of an electronic locking system for providing automatic real-time notifications to at least one user ensuring the security of the storage space, according to one or more embodiments.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the invention. Furthermore, in terms of the construction of the device, one or more components of the device may have been represented in the drawings by conventional symbols, and the drawings may show only those specific details that are pertinent to understanding the embodiments of the invention so as not to obscure the drawings with details that will be readily apparent to those of ordinary skill in the art having the benefit of the description herein.

DETAILED DESCRIPTION

It should be understood at the outset that although illustrative implementations of embodiments are illustrated below, the system and method may be implemented using any number of techniques. The disclosure should in no way be limited to the illustrative implementations, drawings, and techniques illustrated below, including the exemplary design and implementation illustrated and described herein, but may be modified within the scope of the appended claims along with their full scope of equivalents.

The term "some" and "one or more" as used herein is defined as "one, or more than one, or all." Accordingly, the terms "one," "more than one," but not all" or "all" would all fall under the definition of "some." The term "some embodiments" or "one or more embodiments" may refer to one embodiment or several embodiments or all embodiments. Accordingly, the term "some embodiments" is defined as meaning "one embodiment, or more than one embodiment, or all embodiments."

The terminology and structure employed herein are for describing, teaching, and illuminating some embodiments and their specific features and elements and do not limit, restrict, or reduce the spirit and scope of the claims or their equivalents.

More specifically, any terms used herein such as but not limited to "includes," "comprises," "has," "have" and other grammatical variants thereof do not specify an exact limitation or restriction and certainly do not exclude the possible addition of one or more features or elements, unless otherwise stated, and must not be taken to exclude the possible removal of one or more of the listed features and elements, unless otherwise stated with the limiting language "must comprise" or "needs to include."

The term "unit" used herein may imply a unit including, for example, one of hardware, software, and firmware or a combination of two or more of them. The "unit" may be interchangeably used with a term such as logic, a logical block, a component, a circuit, and the like. The "unit" may be a minimum system component for performing one or more functions or may be a part thereof.

Unless otherwise defined, all terms, and especially any technical and/or scientific terms, used herein may be taken to have the same meaning as commonly understood by one having ordinary skill in the art.

Embodiments will be described below in detail with reference to the accompanying drawings.

Embodiments of the invention disclosed herein provides an electronic locking method and system for providing automatic notification to the user to remind them to move the latch trigger to a closed and secure position, thus ensuring the security of the storage space.

In general, embodiments of the invention disclosed herein may include an electronic lock notification system, method, and/or computer program product (herein "electronic locking system") that utilizes an electronic lock for providing an automatic real-time notification to at least one user. Herein a user may also be called a tenant or renter or guest. For example, once the tenant has accessed the electronic lock by using a mobile device to send a credential to the lock and the lock indicator is advertising the status of the latch using Bluetooth® or UWB communication, the mobile device starts monitoring to determine whether the tenant is moving inside/outside a Bluetooth® or UWB communication range of the electronic lock. Accordingly, the mobile device keeps determining the location of the tenant with respect to the location of the electronic lock and the status of the latch, and thereafter when it determines that the mobile device is at threshold level of the Bluetooth range or the UWB range, the mobile device presents an alert to the user of the mobile device if the latch is determined to still be unlocked.

FIG. 1 illustrates an example block diagram of electronic locking system 100 for providing automatic real-time notification to at least one user ensuring the security of the storage space, according to one or more embodiments of the disclosure.

The electronic locking system 100 is only one example of the electronic locking system and is not intended to suggest any limitation as to the scope of use or operability of embodiments of the invention described herein (indeed additional or alternative components and/or implementations may be used).

The electronic locking system 100 includes an electronic lock 101 including a latch 101A and a latch status indicator 101B, a user mobile device 105 associated with a user 103 shown at multiple different positions within the electronic locking system 100, a communication gateway 107, a geo-fence environment represented by a geo-fence 109, an environment 111 outside the geo-fence 109, an administrator 113, and a cloud device 115. As a non-limiting example, the environment 111 may include an elevator area 111A, a parking area 111B, or any other area outside the geofence 109.

The electronic locking system 100 may also include a computing device including at least one processor and/or controller that may perform communication between the user device 105 and the electronic lock 101 and the communication gateway 107. The at least one processor may monitor other components and subcomponents of the electronic locking system 100 or communicate with other components and subcomponents of the electronic locking system 100 through any network communication technologies that can monitor the geofence environment and environment outside the geofence 109. Examples of other systems and subsystems may include security systems, home automation systems, car service systems, travel indication systems, etc. Examples of automatic real-time notifications and/or signals may include generating emails, generating text messages, providing a report to the user, providing real-time status of the latch 101A of the electronic lock 101, etc.

The user device 105 may be an electronic device having short and/or long range communication and location services. As a non-limiting example, the user device 105 may be a smartphone with short and/or long range communication and location services enabled. The user device 105 may also communicate with other systems and sub-systems through any network communication technologies that can monitor the geo-fence environment and may provide automatic notifications to the user 103 (E.g., tenant, etc.). The user device 105 may include a sensing unit to capture the user movements within an environment and a notification application stored on a memory of the user device that provides computer readable instructions to monitor the geo-fence 109 and acquire data parameters therefor. The sensing unit may include an accelerometer sensor, motion sensor, magnetic sensor, positioning and tracking sensors, and other sensors that are capable of tracking and monitoring the movements of a user within an indoor or an outdoor environment. Note that the user device 105 may be representative of a plurality of user devices communicating with the electronic locking system 100, the electronic lock 101, and/or the geo-fence 109.

The electronic lock 101 is a device that has an electronically controlled latch that can be actuated directly to a locked position to prevent or unlocked position to allow communal access for the user 103 to a secure storage in order to keep the user belongings secure. The electronic lock 101 may include the computing device including the processor for communicating with other systems and subsystems through any network communication technologies, such that the automatic notifications are generated and provided to the user 103. The electronic lock 101 may alternately be a type of electronic lock that can hold a traditional mechanical key to be used in a mechanical lock and where the latch movement of locked and unlocked is related to a key container position. The electronic lock 101 also may be in the form of a device or system associated with a real property of the user 103. The electronic lock 101 is installed in a storage space of the real property belonging to or rented by the user.

The geofence environment is a proximity system, virtual perimeter, and/or geo-fence threshold. The geo-fence environment can be temporarily or dynamically generated around a geographic location and/or be a predefined set of boundaries, as in a radius around the electronic lock 101 (e.g., geo-fence 109) or as in property and municipal boundaries. The geo-fence may be a set of latitude and longitude coordinates that in combination describe a boundary around the real property. The geo-fence may be contiguous, or it may cover only the exit points from the real property. The geo-fence may also be defined by structural metadata (e.g., data regarding the design and specification of the geo-fence) and/or descriptive metadata (e.g., data particular to individual property). Note that the geo-fence 109 is only one example of a geo-fence environment and is not intended to suggest any limitation as to the scope of use or operability of embodiments of the invention described herein (indeed additional or alternative components and/or implementations may be used). Geo-fences can be generated and monitored by any detection, communication, and/or location technology, such as global positioning systems ("GPS"), radio frequency identification ("RFID"), near field communication ("NFC"), short wave radio, proximity systems, Bluetooth Low Energy (BLE) beacons, Ultra-wideband (UWB) systems, etc.

Further, the geo-fence environment is utilized by the user device 105 to detect actions and/or movements of the user device 105. For example, at some distance from the property or the electronic lock 101 defined by the geo-fence environment (e.g., 150 meters), the electronic locking system 100 can initiate an automatic real-time notification to the user 103, without the need for the user 103 of the user device 105 to interact with the electronic lock 101. Further, the real-time notification can also indicate the current location of the user as determined by the user device 105, or it may simply indicate that the user has left the property.

The communication gateway 107 may comprise a single, local network, a large network, or a plurality of small or large networks interconnected together. The communication gateway 107 may also comprise any type or number of local area networks (LANs) broadband networks, wide area networks (WANs), and a Long Range Wide Area Network (LoRaWAN), etc. Further, the communication gateway 107 may incorporate one or more LANs, and wireless portions and may incorporate one or more of various protocols and architectures such as TCP/IP, Ethernet, etc. The communication gateway 107 may also incorporate other types of public networks, such as the public switch telephone network (PSTN) or the like. The communication gateway 107 may further include a network interface to communicate via offline and online wireless communication with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols, and technologies, such as LTE, 5G, beyond 5G networks, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS) and LoRaWAN.

Figure 2:
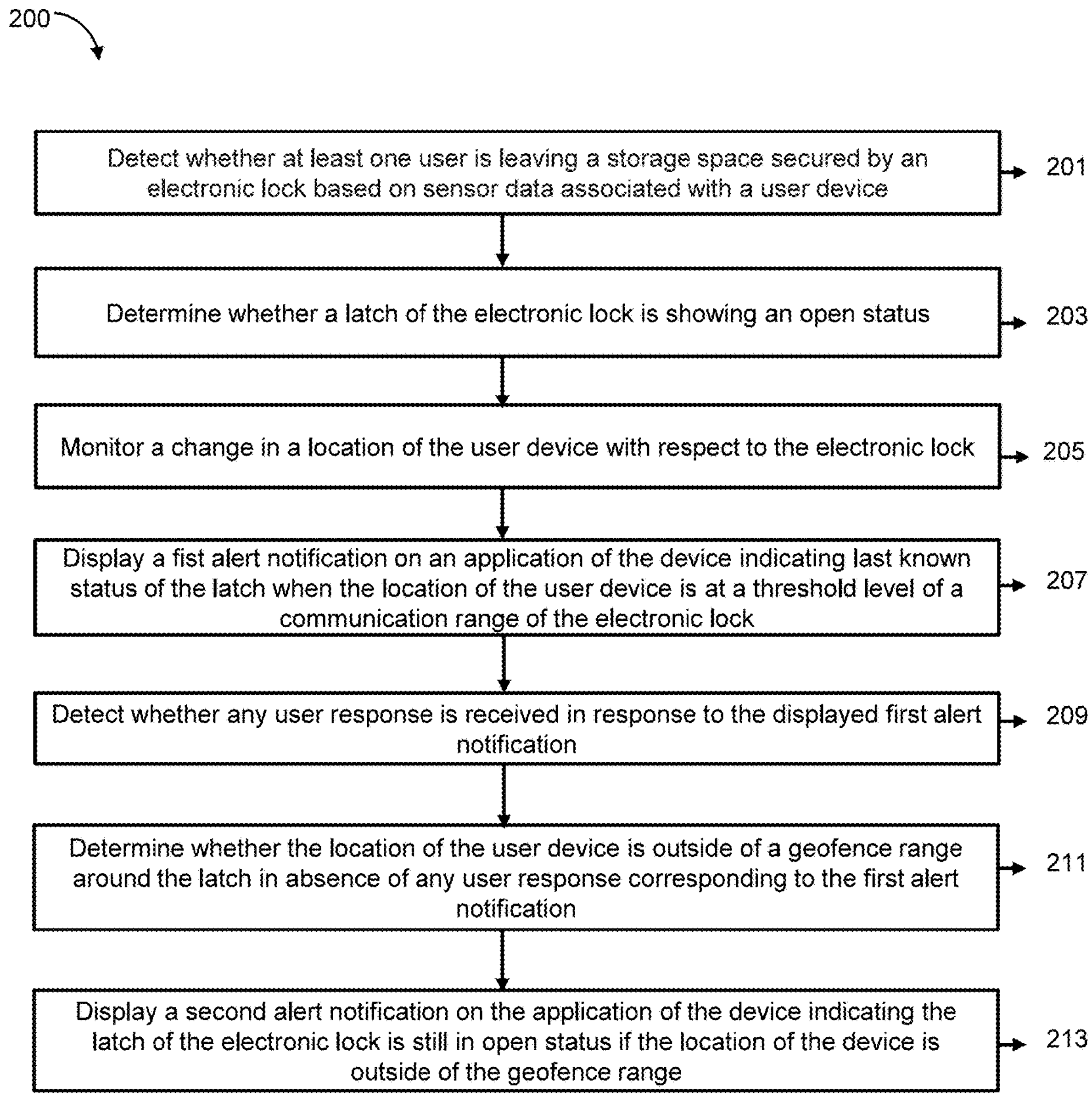
FIG. 2 illustrates a flowchart of method steps performed by the electronic locking system for providing automatic real-time notifications to at least one user ensuring the security of the storage space, according to one or more embodiments.

An example of a set of operations performed by the electronic locking system 100 for providing real-time notifications will be described with reference to FIG. 2 of the drawings. FIG. 2 illustrates a flowchart of method steps performed by the electronic locking system 100 for providing automatic real-time notifications to the user 103 ensuring the security of the storage space or the real property, according to one or more embodiments. The method 200 begins at the step 201.

At step 201, the electronic locking system 100 detects whether a user 103 is leaving a storage space secured by the electronic lock 101. The electronic locking system 100 detects a change in position of the user 103 based on sensor data of a sensing unit associated with a user device 105. As a non-limiting example, the sensing unit such as, but not limited to, an accelerometer sensor starts monitoring movements of the user device 105. Once the user 103 pulls down the storage space shutter, the accelerometer sensor captures the movement of the user device 105. The sensed movement of the user can be referred as the sensor data without any deviation from the scope of the invention. The flow of the method 200 now proceeds to (step 203).

At step 203, the electronic locking system 100 determines whether the latch 101A of the electronic lock 101 is showing an open status. The current state or status of the latch is determined by the electronic locking system 100 by the electronic lock 101 sensor that senses the latch as open or closed. The current state is physically displayed by a latch status indicator 101B. The latch status indicator 101B has two colors. The first color of the latch status indicator 101B indicates an unlocked state of the latch 101A, and the second color of the latch status indicator 101B indicates a locked state of the latch 101A. Additionally, the current state is also electronically advertised by the electronic lock 101 by the latch status indicator 101B sending a Bluetooth or Ultra-Wideband (UWB) message or advertisement with data indicating the current status of the latch. The flow of the method 200 now proceeds to (step 205).

At step 205, the electronic locking system 100 monitors a change in location of the device 105 with respect to the electronic lock 101 when it is determined the latch 101A of the electronic lock 101 is in the open status. A first monitoring process detects whether the location of the device 105 is within or at a threshold level of a communication range of the electronic lock 101. The communication range of the electronic lock 101 corresponds to a Bluetooth range or an Ultra-Wideband (UWB) range of the electronic lock 101. The first detection process is performed based on a received Signal Strength Indicator (RSSI) by the mobile device 105. The first detection process also includes determining the last known state of the electronic lock 101 latch as still being unlocked or open.

According to an embodiment of the disclosure, when it is determined the latch 101A of the electronic lock 101 is closed the electronic locking system 100 disables or stops the monitoring of the change in location of the device 105 with respect to the electronic lock. The flow of the method 200 now proceeds to (step 207).

At step 207, the electronic locking system 100 displays a first alert notification on an application of the user device 105 based on a result of the first monitoring process, when it is determined that the location of the device is at a threshold level of the communication range. The first alert notification indicates a last known status of the latch 101A. As a non-limiting example, the last known state of the latch 101A may correspond to the unlocked or open state of the latch 101A. The flow of the method 200 now proceeds to (step 209).

At step 209, the processor or controller of the electronic locking system 100 detects whether any user response is received from the user device 105 in response to the sent first alert notification. The flow of the method 200 now proceeds to (step 211). The processor or controller of the electronic locking system 100 may corresponds to one of a processor or controller of the electronic lock 101 or a processor or controller of the user device 105.

At step 211, the electronic locking system 100 determines, in a case where it is detected that any user response is not received from the user device 105 in response to the sent first alert notification, a second monitoring process to re-determine whether the location of the device is within or out of a geofence. The detection of the geofence may be done by the user device 105. The flow of the method 200 now proceeds to (step 213).

At step 213, the electronic locking system 100 displays a second alert notification to the application of the user device 105 based on a result of the second detection process that indicates that the location of the device is out of geofence. The second alert notification also indicates the last known status of the latch 101A. As a non-limiting example, the last known state of the latch 101A may correspond to the unlocked or open state of the latch 101A.

In one or more embodiments, the electronic locking system 100 may also determine a time period for which the latch status is still open and sends a message to a cloud server and the cloud server sends a third notification alert to the user device 105 indicating that the electronic lock is still unlocked. It is to be noted that the third notification alert may be sent to user device 105 before the first alert and second alert notifications, in between the first alert and second alert notifications, or after the first alert and second alert notifications.

Figure 3:
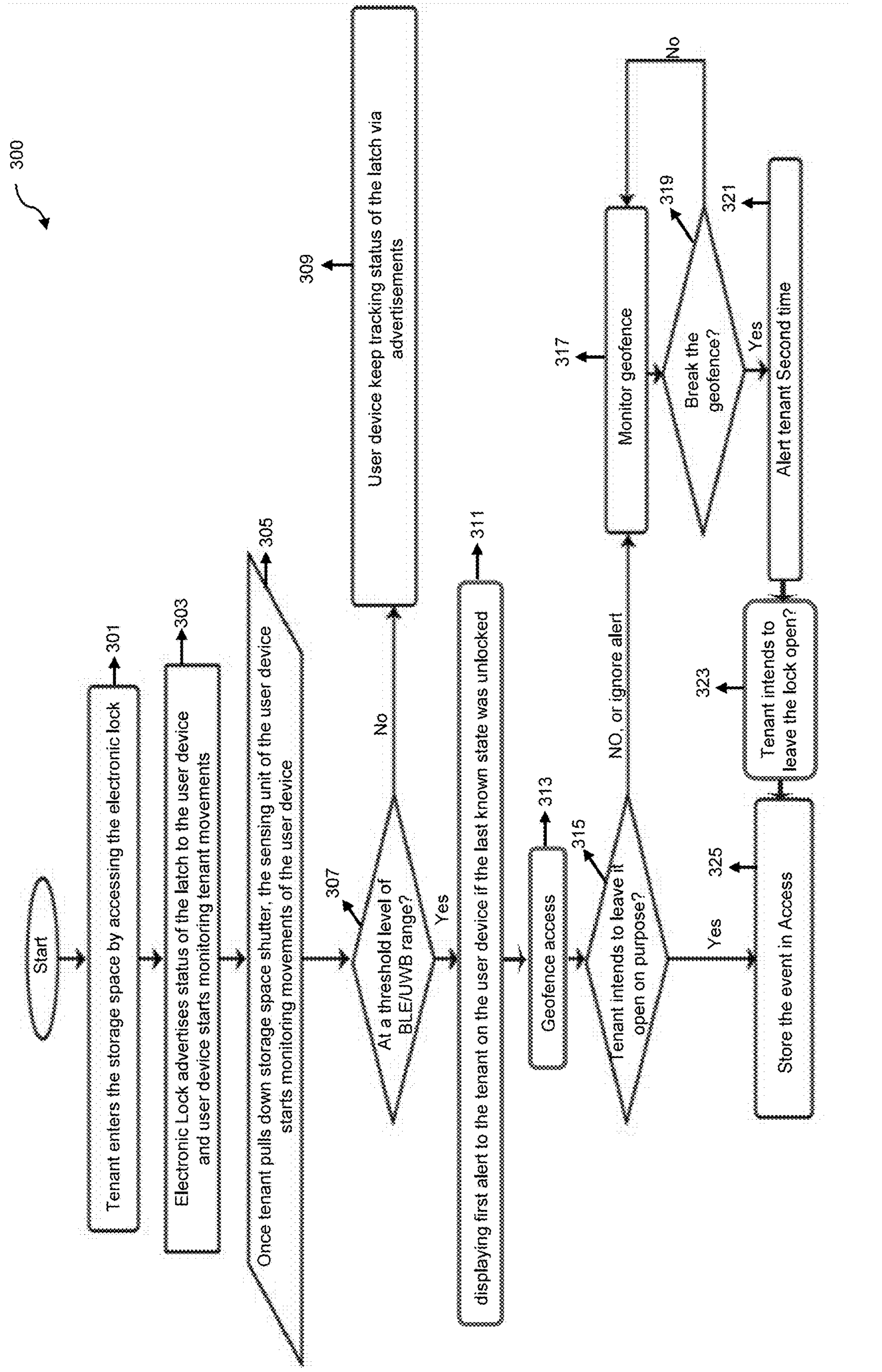
FIG. 3 illustrates a detailed flowchart of complete method steps that are performed by the electronic locking system for providing automatic real-time notifications to at least one user, according to one or more embodiments.

Referring now to FIG. 3 illustrates a detailed flowchart of the method steps that are performed by the electronic locking system for providing the automatic real-time notifications to the at least one user, according to one or more embodiments of the disclosure. FIG. 3 depicts a method 300 depicting a stepwise explanation for providing the automatic real-time notifications to the at least one user. The method 300 begins at the step 301.

At step 301, the electronic lock 101 detects whether the user 103 (tenant) enters the storage space by accessing the electronic lock 101 based on a current status of an engagement or disengagement of the latch 101A of the electronic lock 101. The flow of the method 300 now proceeds to (step 303).

At step 303, the electronic lock 101 advertises the status of the latch 101A to the user device 105 and the user device 105 starts monitoring movements of the user 103 using the accelerometer sensor. Additionally, based on the movements, the electronic lock 101 provides advertisement status of the latch to the user 103. The flow of the method 300 now proceeds to (step 305).

At step 305, the user device 105 detects whether the user 103 is leaving the storage space based on sensor data of the sensing unit associated with a user device 105. Then the user device 105 monitors the change in its location with respect to the electronic lock 101 based on the result of the detection indicating the user 103 is leaving the storage space. As a non-limiting example, the sensing unit such as, but not limited to, an accelerometer sensor starts monitoring movements of the user device 105. Once the user 103 pulls down the storage space shutter, the accelerometer sensor captures the movement of the user device 105. The sensed movement of the user can be referred as the sensor data without any deviation from the scope of the invention. Accordingly, the user device 105 starts monitoring the change in its location with respect to the electronic lock 101. The flow of the method 300 now proceeds to (step 307).

At step 307, the user device 105 determines whether the user device 105 is at the threshold level of the communication range based on the monitoring of the user's location with respect to the electronic lock 101. The threshold level of the communication range corresponds to a very low level of Bluetooth range or a very low level of the UWB range. In particular, the user device 105 keeps monitoring the user's location with respect to the location of the electronic lock 101 once it is detected that the storage space shutter is pulled down by the user. The user device 105 monitors whether the user device 105 is at the threshold level of the communication range (e.g., whether the user is leaving the door, walking to the elevator 111A for down to the floor, to the parking area 111B, etc.) by tracking the location of the user 103 with respect to the electronic lock 101. As a non-limiting example, when a distance between the user 103 keeps on increasing i.e., (e.g., 15 meters→30 meters→50 meters, etc. and when it increases beyond the threshold distance range of the communication range, the user device 105 determines that the user 103 is moving out of the threshold level of the communication range. Moreover, the user device 105 determines whether the user is moving outside the communication range based on a decreasing signal strength indicator (RSSI) that correlates to a distance of the user device 105 away from the electronic lock 101. Once, the user device 105 detects whether the location of the user device 103 is within or at the threshold level of the communication range of the electronic lock 101. In case a result of the detection at step 307 is NO, then the flow of the method 300 now proceeds to (step 309).

At step 309, the user device 105 keeps tracking status of the latch 101A of the electronic lock 101 via advertisements. In particular, the user device 105 may keep monitoring the current state of the latch 101A periodically based on the result of the detection process that indicates that the location of the user device 105 is within the threshold level of the communication range. However, in case a result of the detection at step 307 is Yes, then the flow of the method 300 now proceeds to (step 311).

At step 311, the user device 105 displays the first alert notification to the user 103 via the application if the last known state of the latch 101A was open or unlocked and the user 103 is at the threshold level of the communication range, i.e., the very low level of the Bluetooth range and the very low level of the UWB range. The flow of the method 300 now proceeds to (step 313).

At step 313, the user device 105 detects whether any user response is received in response to the sent first alert notification. The user device 105 monitors the geofence 109 and checks the status of the latch 101A and display the current status of the latch to the user 103 on the application of the user device 105. The geofence 109 corresponds to a GPS-enabled communication range. The flow of the method 300 now proceeds to (step 315).

At step 315, the user device 105 detects whether the user 103 intends to close the electronic lock 101 by engaging the latch 101A or intends to leave it open on purpose by detecting whether any user response is received in response to the displayed first alert notification. In case a result of the detection at step 315 is NO, then the flow of the method 300 now proceeds to (step 317).

At step 317, the user device 105 further continuously monitors the geofence 109 of the electronic lock 101 in absence of any user response in response to the displayed first alert notification. The flow of the method 300 now proceeds to (step 319).

At step 319, the user device 105 again determines whether the user 103 is moving away from the geofence 109 based on the monitoring of the user location with respect to the electronic lock 101 using any detection, communication, and/or location technology, such as global positioning systems ("GPS"), radio frequency identification ("RFID"), near field communication ("NFC"), short wave radio, proximity systems, Bluetooth Low Energy (BLE) beacons, etc. In case the result of the determination at step 319 is NO, then the electronic lock 101 keeps monitoring the geofence 109 until the result of the determination at step 319 becomes Yes. However, in case a result of the determination at step 319 is Yes, then the flow of the method 300 now proceeds to (step 321).

At step 321, the user device 105 displays a second alert notification to the user 103 on the application of the user device 105 indicating the last known status of the latch 101A. As a non-limiting example, the second alert notification may indicate that the latch of the electronic lock is still open. The flow of the method 300 now proceeds to (step 323).

At step 323, the user device 105 again detects whether the user 103 intends to close the electronic lock 101 by engaging the latch 101A or intends to leave it open on purpose by detecting whether any user response is received in response to the displayed second alert notification.

Further, in case a result of the detection at step 315 or step 323 is yes, then the flow of the method 300 now proceeds to (step 325). At step 325, the user device 105 may send the indication of the user to the cloud device 115 to be stored in the cloud along with other audit information. The electronic lock 101 may also send indication to the cloud device 115 when the latch 101A is opened or closed. The electronic lock 101 send the indication to the cloud device 115 using an established LoRaWAN connection with the cloud device. The electronic lock 101 may also send the indication as a message over LoRaWAN protocol to a gateway which then sends the message to the cloud device 115. The user device 105 may send the indications of the user when it displays alert notifications to the user indicating the latch 101A is open, closed, or has an error. The user device may also send the user response received in response to any of the displayed first alert notification or the displayed second alert notification to the cloud device 115.

The cloud device 115 may include a database that has a unified audit log. The unified audit log may indicate one or more events including, but are not limited to, the user device 105 has requested to open the latch 101A, the electronic lock 101 is actually opened, the user device 105 is at the threshold level of the communication range, the user device prompted the user 103 for the second time indicating the status of the latch 101A, no user response is received in response to the prompted attempt, the user 103 has provided a response to leave the electronic lock 101 open on purpose, the user 103 has provided a response close the electronic lock 101, or the electronic lock 101 sends a notification message indicating that it is still open or closed.

According to an embodiment of the disclosure, when the cloud device 115 receives the indication regarding the status of the latch 101A from the electronic lock that it is closed. Then the cloud device 115 may also send a message to the user device 105 indicating the updated status of the latch 101A, or the cloud device 115 may simply record the status of the latch 101A indicated in the received indication. At some point of time, the cloud device 115 may send the message to the user device 105 indicating the updated status of the latch 101A to the user device when a request to know the latest status of the latch 101A is received from the user device 105. Further, when the user device 105 receives the message having indication that the latest or updated status of the latch 101A is now closed, then the user device 105 may also decide to stop or disable the monitoring of the change of location or the geofence 109.

Also, the user device 105 may also stop monitoring the geofence 109 of the electronic lock 101 when it receives a user response in response to the displayed first alert notification indicating that the user 103 intends to leave the electronic lock 101 open on purpose.

According to some embodiment, the processor or controller of the electronic lock 101 or the user device 105 may also store the second alert notification in the cloud device 115 as a second event. Also, each time when the status of the latch 101A is changed by the user 103, the processor or controller of the electronic lock 101 stores the changed status of the latch in the cloud device 115 as the last known status of the latch 101A.

According to some embodiment, the processor or controller of the electronic lock 101 may also send the second alert notification to a device of the administrator 113 indicating the last known status of the latch 101A.

In one or more embodiments, the processor or controller of the electronic lock 101 may also notify the device of the administrator 113 indicating which door of the facility or the real property of the user 103 is left open when the door shutter is pulled but latch 101A of the electronic lock 101 is not engaged.

In one or more embodiments, the first, second, and third alert notification may correspond to a push alert notification without any deviation from the scope of the invention disclosed herein.

According to the one or more embodiments disclosed herein, based on the results of the detection processes that indicate that the location of the device is at the threshold level of the Bluetooth range or the UWB range and in absence of the user response to the previous alert notifications, the processor or controller of the electronic lock 101 may keep sending the alert notifications to the application of the user device 105 until the current status of the latch 101A changes from the unlocked state to the locked state.

Figure 4:
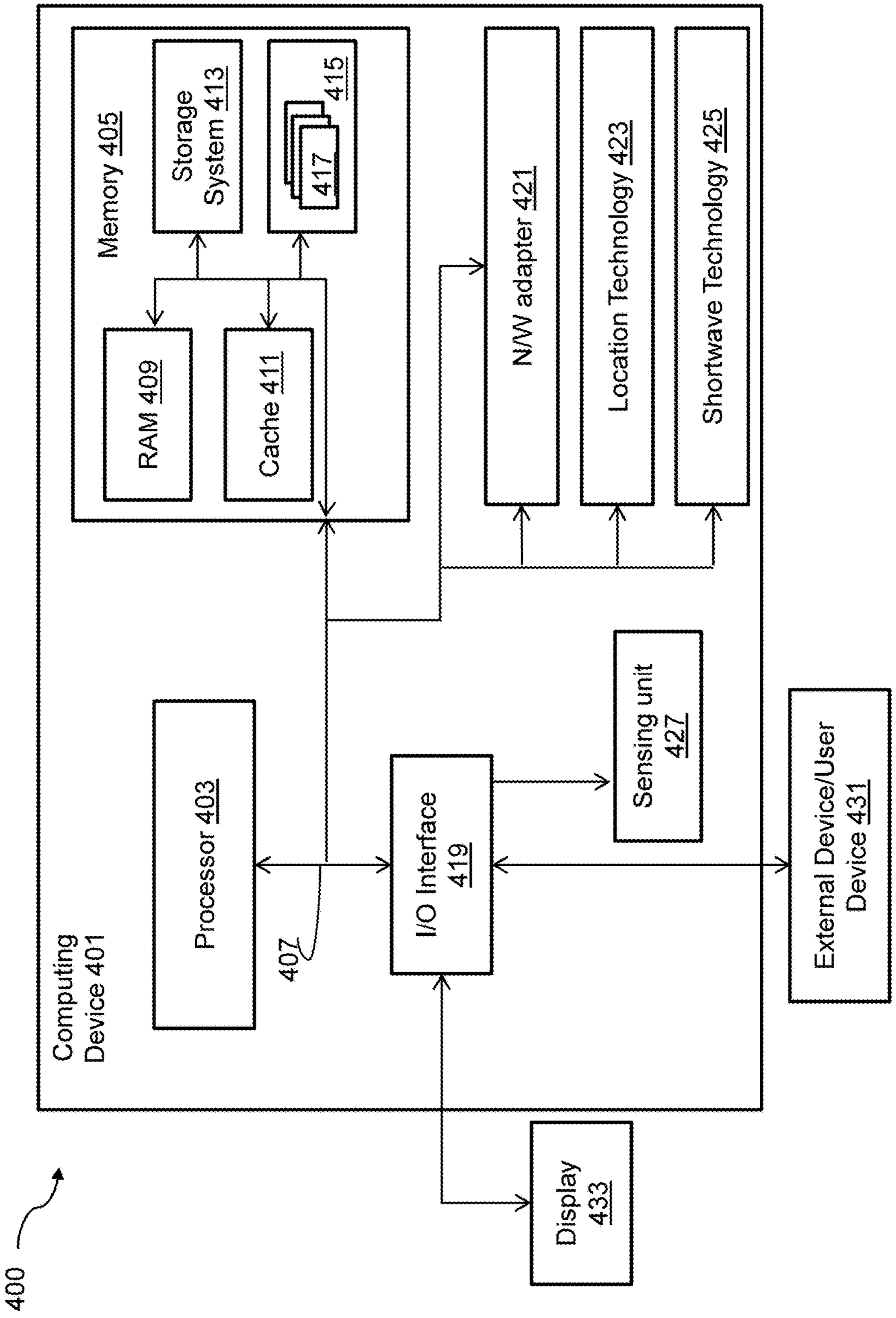
FIG. 4 illustrates a computing device schematic of the electronic locking system, according to one or more embodiments.

Referring now to FIG. 4 illustrates a computing system schematic of the electronic locking system, according to one or more embodiments. The computing system 400 (e.g., the electronic locking system 100) is only one example of a suitable computing node and is not intended to suggest any limitation as to the scope of use or operability of embodiments of the invention described herein (indeed additional or alternative components and/or implementations may be used). That is, the computing system 400 and elements therein may take many different forms and include multiple and/or alternate components and facilities. Further, the computing system 400 may include and/or employ any number and combination of computing devices and networks utilizing various communication technologies, as described herein. Regardless, the computing system 400 is capable of being implemented and/or performing any of the operability set forth hereinabove.

In the computing system 400 there is a computing device 401, which is operational with numerous other general-purpose or special-purpose computing system environments or configurations. Systems and/or computing devices, such as the computing system 400 and/or the computing device 401, may employ any of a number of computer operating systems. Examples of computing systems, environments, and/or configurations that may be suitable for use with the computing device 401 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, computer workstations, servers, desktops, notebooks, network devices, mainframe computer systems, and distributed cloud computing environments that include any of the above systems or devices, and the like.

The computing device 401 may be described in the general context of computer system executable instructions, such as program modules, being executed by a computer system. Generally, program modules may include routines, programs, objects, components, logic, data structures, and so on that perform particular tasks or implement particular abstract data types. The computing device 401 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, the computing device 401 in the computing system 400 is in the form of a general-purpose computing device that is improved upon by the operation and functionality of the computing system 400, its methods, and/or elements thereof. The components of the computing device 401 may include, but are not limited to, one or more central processing units (herein 'processor') 403, a memory 405, and a bus (or communication channel) 407 which may take the form of a bus, wired or wireless network, or other forms, that couples various system components including to the processor 403 and the memory 405. The computing device 401 also typically includes a variety of computer system-readable media. Such media may be any available media that is accessible by the computing device 401, and it includes both volatile and non-volatile media, removable and non-removable media.

The processor 403 may receive computer-readable program instructions from the memory 405 and execute these instructions, thereby performing one or more processes defined by the computing system 400. The processor 403 may include any processing hardware, software, or combination of hardware and software utilized by the computing device 401 that carries out the computer-readable program instructions by performing arithmetical, logical, and/or input/output operations. Examples of the processor 403 include, but are not limited to an arithmetic logic unit, which performs arithmetic and logical operations; a control unit, which extracts, decodes, and executes instructions from a memory; and an array unit, which utilizes multiple parallel computing elements.

The memory 405 may include a tangible device that retains and stores computer-readable program instructions, as provided by the computing system 400, for use by the processor 403 of the computing device 401. The memory 405 can include computer system readable media in the form of volatile memory, such as random-access memory 409, cache memory 411, and/or the storage system 413.

By way of example only, the storage system 413 can be provided for reading from and writing to a non-removable, non-volatile magnetic media (not shown and typically called a "hard drive", either mechanical or solid-state). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 407 by one or more data media interfaces. As will be further depicted and described below, the memory 405 may include at least one program product having a set (e.g., at least one) of program modules that are configured to carry out the operations of embodiments of the invention. The storage system 413 (and/or memory 405) may include a database, data repository, or other data store and may include various kinds of mechanisms for storing, accessing, and retrieving various kinds of data, including a hierarchical database, a set of files in a file system, an application database in a proprietary format, a relational database management system (RDBMS), etc. The storage system 413 may generally be included within the computing device 401, as illustrated, employing a computer operating system such as one of those mentioned above, and is accessed via a network in any one or more of a variety of manners.

Program/utility 415, having a set (at least one) of program modules 417, may be stored in memory 405 by way of example, and not limitation, as well as an operating system, one or more application programs, other program modules, and program data. Each of the operating systems, one or more application programs, other program modules, and program data or some combination thereof, may include an implementation of a networking environment. Program modules 417 generally carry out the operations and/or methodologies of embodiments of the invention as described herein.

The bus 407 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computing device 401 may also communicate via an input/output (I/O) interface 419, a network adapter 421, location technology 423, and/or shortwave technology 425. The I/O interface 419 and/or the network adapter 421 may include a physical and/or virtual mechanism utilized by the computing device 401 to communicate between elements internal and/or external to the computing device 401. For example, the I/O interface 419 may communicate with one or more external devices 431, such as a keyboard, a pointing device, a display 433, etc. One or more devices that enable a user to interact with the computing device 401 and/or any devices (e.g., network card, modem, etc.) that enable the computing device 401 to communicate with one or more other computing devices. Further, the computing device 401 can communicate to the electronic lock 101 over one or more wireless connections such as Bluetooth, Bluetooth low energy, Infrared, NFC (Near Field Communication), UWB, etc. Further, the computing device 401 can communicate with one or more networks such as a local area network (LAN), a general wide area network (WAN), LoRaWAN, and/or a public network (e.g., the Internet) via network adapter 421. Thus, I/O interface 419 and/or the network adapter 421 may be configured to receive or send signals or data within or for the computing device 401. As depicted, the I/O interfaces 419 and the network adapter 421 communicates with the other components of the computing device 401 via the bus 407. It should be understood that although not shown, other hardware and/or software components could be used in conjunction with the computing device 401. Examples, include but are not limited to, microcode, device drivers, redundant processing units, external disk drive arrays, RAID systems, tape drives, and data archival storage systems, etc.

The computing device 401 may also include a sensing unit 427 connected to the processor 403 via the I/O interfaces 419. The sensing unit 427 may include an accelerometer sensor, motion sensor, magnetic sensor, positioning and tracking sensors, and other sensors that are capable of tracking and monitoring the movements of the user 103 within the indoor or outdoor environment.

The units, amongst other things, include routines, programs, objects, components, data structures, etc., which perform particular tasks or implement data types. The units may also be implemented as, signal processor(s), state machine(s), logic circuitries, and/or any other device or component that manipulates signals based on operational instructions.

While single items are illustrated for the computing system 400 (and other items) by FIG. 4, these representations are not intended to be limiting and thus, any items may represent a plurality of items. In general, computing devices may include a processor (e.g., a processor 403 of FIG. 4) and a computer-readable storage medium (e.g., a memory 405 of FIG. 4), where the processor receives computer-readable program instructions, e.g., from the computer-readable storage medium, and executes these instructions, thereby performing one or more processes, including one or more of the processes described herein.

Computer readable program instructions may be compiled or interpreted from computer programs created using assembler instructions, instruction-set-architecture (ISA) instructions, machine instructions, machine dependent instructions, microcode, firmware instructions, state-setting data, or either source code or object code written in any combination of one or more programming languages. The computer-readable program instructions may execute entirely on a computing device, partly on the computing device, as a stand-alone software package, partly on a local computing device and partly on a remote computer device, or entirely on the remote computer device. In the latter scenario, the remote computer may be connected to the local computer through any type of network, including a local area network (LAN) or a wide area network (WAN), or the connection may be made to an external computer (for example, through the Internet using an Internet Service Provider). Computer-readable program instructions described herein may also be downloaded to respective computing/processing devices from a computer-readable storage medium or to an external computer or external storage device via a network (e.g., any combination of computing devices and connections that support communication). For example, a network may be the Internet, a local area network, a wide area network, and/or a wireless network, comprising wireless transmission, routers, firewalls, switches, gateway computers, and/or edge servers, and utilize a plurality of communication technologies, such as radio technologies, cellular technologies, etc.

Computer-readable storage mediums may be a tangible device that retains and stores instructions for use by an instruction execution device (e.g., a computing device as described above). A computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes, but is not limited to a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Thus, the electronic locking system and/or elements thereof may be implemented as computer-readable program instructions on one or more computing devices, stored on a computer-readable storage medium associated therewith. A computer program product may comprise such computer-readable program instructions stored on the computer-readable storage medium for carrying and/or causing a processor to carry out the operations of the electronic locking system. The electronic locking system, as implemented and/or claimed, improves the functioning of a computer and/or the processor itself by enabling a seamless user experience between the user property (i.e., secure storage), the electronic lock, and the user device system through direct computations of user positions and directions that are further utilized to deliver faster and more automatic real-time notifications.

The technical effects and benefits include providing notifications to the users if they left the door unlocked before they leave the real property or secure storage facility.

Further, the technical effects and benefits include securing the storage space by providing automatic real-time notification reminders indicating the last known status of the latch 101A of the electronic lock. For example, the automatic real-time notification reminders may indicate "Last time I saw your lock is unlocked, are you sure you locked it?" In this way, it helps in securing the storage space by reminding the users each time they leave the real property or secure storage unlocked. Those skilled in the art will appreciate that the aforementioned example of the automatic real-time notification reminders is merely exemplary and is not intended to limit the scope of the invention.

Further, the technical effects and benefits include enabling more accurate notification reminders. The electronic lock 101 keeps reminding the user periodically until it receives a response from the user indicating that he/she intends to leave the secure storage facility open on purpose. In this way, an improvement in the enabling of more accurate notification reminders to the user is performed by the electronic locking system.

The technical effects and benefits also include feeding each of the alert notification into the cloud device 115 as an event for the record which is specifically helpful in cases like user want to check at which time these facilities were accessed and also helps in knowing the last events at which the secure storage facility or the real property left open.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the operations/acts specified in the flowchart and/or block diagram block or blocks. These computer-readable program instructions may also be stored in a computer-readable storage medium that can direct a computer, a programmable data processing apparatus, and/or other devices to operate in a particular manner, such that the computer-readable storage medium having instructions stored therein comprises an article of manufacture including instructions which implement aspects of the operation/act specified in the flowchart and/or block diagram block or blocks.

The computer-readable program instructions may also be loaded onto a computer, other programmable data processing apparatus, or other device to cause a series of operational steps to be performed on the computer, other programmable apparatus, or other device to produce a computer-implemented process, such that the instructions which execute on the computer, other programmable apparatus, or other device implement the operations/acts specified in the flowchart and/or block diagram block or blocks.

The flowchart and block diagrams in the FIGS. illustrate the architecture, operability, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical operation(s). In some alternative implementations, the operations noted in the block may occur out of the order noted in the FIGS. For example, two blocks shown in succession may, in fact, be executed substantially concurrently, or the blocks may sometimes be executed in the reverse order, depending upon the operability involved. It will also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting to the invention. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram, or the steps (or operations) described therein without departing from the spirit of the invention. For instance, the steps may be performed in a differing order, or steps may be added, deleted, or modified. All of these variations are considered a part of the claimed invention.

While the preferred embodiment of the invention had been described, it will be understood that those skilled in the art, both now and in the future, may make various improvements and enhancements which fall within the scope of the claims which follow. These claims should be construed to maintain the proper protection for the invention first described.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for providing an automatic real-time notification to at least one user by an electronic locking system, comprising:

detecting whether the at least one user, based on a sensor data of a sensing unit associated with a device of the at least one user, is leaving a storage space secured by an electronic lock of the electronic locking system;

determining, upon detecting that the at least one user is leaving the storage space, whether a latch of the electronic lock is showing an open status;

monitoring a change in a location of the device with respect to the electronic lock upon determining the latch of the electronic lock is in the open status;

displaying, when the location of the device is at a threshold level of a communication range of the electronic lock, a first alert notification on an application of the device indicating a last known status of the latch;

detecting whether any user response is received in response to the displayed first alert notification;

determining whether the location of the device is outside of a geofence range around the electronic lock in one of a presence or an absence of any user response corresponding to the first alert notification; and displaying, when it is determined that the location of the device is outside of the geofence range, a second alert notification on the application of the device indicating the latch of the electronic lock is in the open status.

2. The method as claimed in claim 1, wherein the storage space corresponds to one of a storehouse, a warehouse, a house, or a repository.

3. The method as claimed in claim 1, wherein the electronic lock is installed on a door frame to lock the storage space, in which the latch is configured to protrude into the door frame.

4. The method as claimed in claim 1, wherein the communication range corresponds to a Bluetooth Low Energy (BLE) range or an Ultra-Wide-band (UWB) range, and wherein the geofence range corresponds to a GPS-enabled communication range.

5. The method as claimed in claim 1, wherein the monitoring of the change of location of the device with respect to the electronic lock is based on a BLE or an Ultra-wideband Received Signal Strength Indication (UWB RSSI) threshold.

6. The method as claimed in claim 1, wherein a status of the latch is periodically monitored or determined by scanning the electronic lock for the Bluetooth or UWB advertisement indicating the latch status.

7. The method as claimed in claim 1, further comprising:

storing, as a first event, the displayed first alert notification in a cloud server when the user response is received in response to the sent first alert notification.

8. The method as claimed in claim 1, further comprising:

storing the displayed second alert notification in the cloud server as a second event.

9. The method as claimed in claim 1, further comprising:

determining that the latch status is closed by a periodic scanning of the electronic lock for the Bluetooth or UWB advertisement indicating the latch status.

10. The method as claimed in claim 1, further comprising: determining that the latch status is closed based on a reception of a message from the cloud server indicating the latch is now closed.

11. The method as claimed in claim 1, further comprising: disabling the monitoring of the change of location of the device when the status of the latch is closed.

12. The method as claimed in claim 1, further comprising: disabling the monitoring of the change of location of the device when a user response indicating an intention to keep the latch open is received in response to the displayed second alert notification.

13. The method as claimed in claim 1, wherein the electronic lock includes a locking status indicator having two colors, wherein a first color of the locking status indicator indicates that the latch is open, and wherein a second color of the locking status indicator indicates that the latch is closed.

14. The method as claimed in claim 1, further comprising: periodically sending, via a gateway connection, a message from the electronic locking system to the cloud server in any one of the cases including when it is determined that the latch status is now open, the latch status is still open after a time period has passed since the last status indicating the latch was open, or the latus is now closed.

15. The method as claimed in claim 1, wherein the displayed second alert notification includes an indication that the latch is still open and a plurality of options corresponding to the selection of whether to continue monitoring the latch status, ignore and tell me again later, or intended to keep the latch open.

16. The method as claimed in claim 1, wherein the response to the plurality of options corresponding to the second alert notification is recorded in the cloud server for a reporting purpose.

17. The method as claimed in claim 1, wherein the gateway connection corresponds to a Long Range Wide Area Network (LoRaWAN).

18. An electronic locking system for providing an automatic real-time notification to at least one user, comprising:

a sensing unit:

an electronic lock including a latch; and at least one processor configured to:

detect whether the at least one user, based on a sensor data of the sensing unit associated with a device of the at least one user, is leaving a storage space secured by the electronic lock of the electronic locking system;

determine, upon detecting that the at least one user is leaving the storage space, whether the latch of the electronic lock is showing an open status;

monitor a change in a location of the device with respect to the electronic lock upon determining the latch of the electronic lock is in the open status;

control a display screen to display, when the location of the device is at a threshold level of a communication range of the electronic lock, a first alert notification on an application of the device indicating a last known status of the latch;

detect whether any user response is received in response to the displayed first alert notification;

determine whether the location of the device is outside of a geofence range around the latch in one of a presence or an absence of any user response corresponding to the first alert notification, and control the display screen to display, when it is determined that the location of the device is outside of the geofence range, a second alert notification on the application of the device indicating the latch of the electronic lock in the open status.

19. The system as claimed in claim 18, wherein the electronic lock is installed on a door frame to lock the storage space, in which the latch is configured to protrude into the door frame.

20. The system as claimed in claim 18, wherein the communication range corresponds to a Bluetooth Low Energy (BLE) range or an Ultra-Wide-band (UWB) range, wherein the geofence range corresponds to a GPS-enabled communication range, and wherein the monitoring of the change of location of the device with respect to the electronic lock is based on a BLE or an Ultra-wideband Received Signal Strength Indication (UWB RSSI) threshold.

* * * * *